April 17, 1928.

J. A. JOHNSON 1,666,139

TRUCK FOR STOVES OR THE LIKE

Filed Aug. 20, 1925

INVENTOR
JOHN ADOLPH JOHNSON.
BY
ATTORNEY

April 17, 1928.
J. A. JOHNSON
TRUCK FOR STOVES OR THE LIKE
Filed Aug. 20, 1925
1,666,139
2 Sheets-Sheet 2
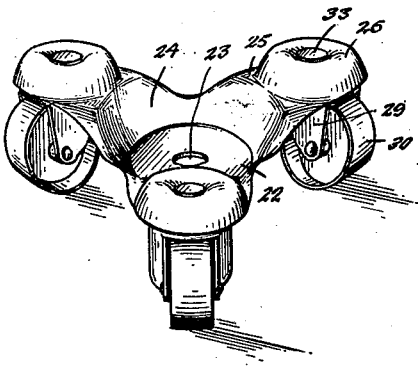
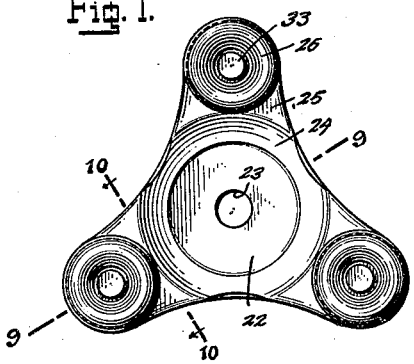
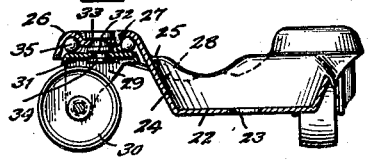
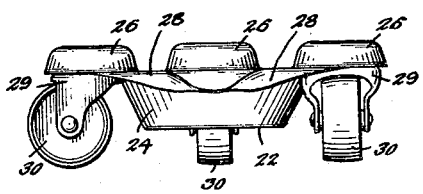
INVENTOR
JOHN ADOLPH JOHNSON.
BY
ATTORNEY Patented Apr. 17, 1928.

1,666,139

UNITED STATES PATENT OFFICE.

JOHN ADOLPH JOHNSON, OF MERIDEN, CONNECTICUT, ASSIGNOR TO THE BASSICK COMPANY, OF BRIDGEPORT, CONNECTICUT, A CORPORATION OF CONNECTICUT.

TRUCK FOR STOVES OR THE LIKE.

Application filed August 20, 1925. Serial No. 51,285.

The present invention relates to improved stove trucks, of the type used in sales-rooms for displaying stoves, or the like, in a manner to permit their convenient mobility, an object of the invention being to provide a stove truck formed of sheet metal, pressed to shape, and having advantages of construction and function over the previous cast metal form of truck. These cast metal trucks, heretofore in use, where not only expensive to manufacture, but were heavy and inconvenient to handle, and the manner of suspending the stove leg upon the cast structure between spaced caster supports was such as to subject the truck to fracture and breakage. The cast structure also necessitated machining operations for the mounting of the casters, which also added to its cost of production.

It is proposed in the present invention, therefore, to provide a stove truck, formed from sheet metal, and having strengthening means to withstand bending strains, so that a light, strong structure is provided; and further, to provide improved caster mounting portions, adapted for the reliable mounting of the casters without machining, or other additional operations.

A further object is to provide caster mounting portions pressed integrally with the truck, and which constitute ball-races, adapted to co-operate with the caster horns to support anti-friction balls, thereby enabling the construction of an extremely simple, inexpensive, and reliable ball-bearinged truck.

With the above and other objects in view, embodiments of the invention are shown in the accompanying drawings, and these embodiments will be hereinafter more fully described with reference thereto, and the invention will be finally pointed out in the claims.

In the drawings:

Fig. 6 is a perspective view of a stove truck, according to a modified form of the invention, and in which integral ball-races are formed in the truck;

Fig. 7 is a plan view thereof;

Fig. 8 is a side elevation of the same;

Fig. 9 is a sectional view, taken along the line 9—9 of Fig. 7; and

Fig. 10 is a sectional view, taken along the line 10—10 of Fig. 7.

Similar reference characters indicate corresponding parts throughout the several figures of the drawings.

Figure 1:
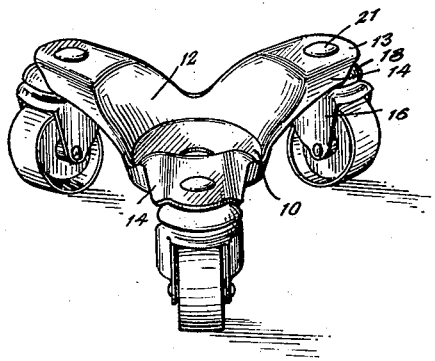
Fig. 1 is a perspective view of a stove truck, according to one embodiment of the invention.
Figure 2:
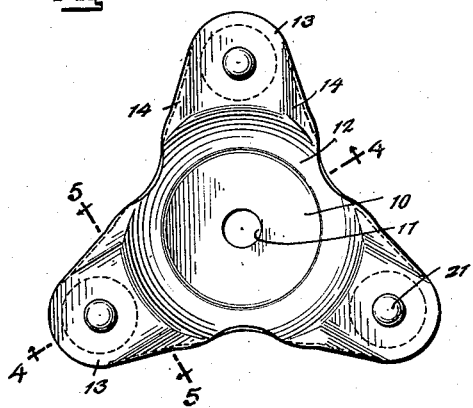
Fig. 2 is a plan view thereof.
Figure 4:
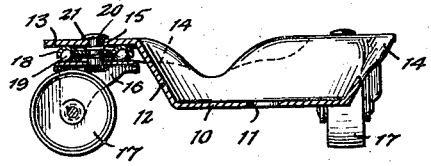
Fig. 4 is a sectional view, taken along the line 4—4 of Fig. 2.
Figure 3:
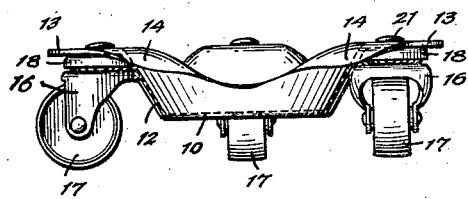
Fig. 3 is a side elevation of the same.
Figure 5:
Fig. 5 is a sectional view, taken along the line 5—5 of Fig. 2.

Referring to the drawings, and more particularly to Figs. 1 to 5 thereof, the improved stove truck, according to the embodiment of the invention shown therein, comprises a substantially triangular frame or base formed of sheet metal, preferably steel, and including a circular dished portion provided with a flat base 10, centrally apertured, as at 11, and having an outwardly inclined circular wall 12. At three equally spaced points the circular wall 12 is extended upwardly in inclined relation and bent outwardly into flat radially projected horizontally disposed caster mounting portions 13, the bend between the wall 12 and said portions 13 being rounded in cross section and circumferential to the center of the truck. The curvature of the bend renders it substantially non-bending under a weight imposed centrally of the truck, and the portions 13 are further reinforced against bending by providing flanges 14 bent downwardly and extending along the side edges of said portions 13 to a point substantially adjacent the central depressions in the edge of the wall 12 between the caster mounting portions, the structure providing a strong, non-bending construction, which may be pressed by a single operation from flat sheet metal.

The portions 13 are centrally apertured, as at 15, for securing the casters thereto, these apertures being preferably cut simultaneously with the pressing of the sheet metal base. The casters are of ball-bearing type, and each includes a horn 16 rotatably supporting a caster wheel 17, an annularly grooved ball retainer cap 18, between which and the top of the horn the balls 19 are interposed, and a shouldered spindle 20 secured in the aperture 15 of the mounting portion 13 by riveting over, as at 21.

In practice, the leg of the stove, or other article to be movably supported, is set in the concavity of the truck where it is supported and positioned in a manner to be freely moved and turned in any direction. The sheet metal structure provides a light weight, non-bending, and unbreakable truck, which may be manufactured at small cost, and is entirely reliable in operation.

In Figs. 6 to 10 there is illustrated a modified form of the invention, in which the pressed sheet metal frame or base comprises a circular dished portion provided with a flat base 22, centrally apertured, as at 23, and having an outwardly inclined circular wall 24 extended upwardly in inclined relation at three spaced points and bent outwardly to provide radially projecting horizontally disposed caster mounting portions 25, the bend being circumferential to the center of the truck to provide a non-bending structure. The portions 25 are pressed into annularly grooved embossed circular portions 26, forming ball races at the under side, the central depressed portions within the races being apertured, as at 27, for securing the spindles of the casters. The caster mounting portions are further reinforced against bending by means of downwardly bent flanges 28 extending between the sides thereof and the circular wall 24.

The casters each comprises a horn 29 rotatably supporting a caster wheel 30, and attached to the portion 26 of the truck frame by a spindle 31, having a central shoulder 32 interposed between the top of the horn and the center of the portion 26, and secured by heading over the ends as at 33 and 34. Anti-friction balls 35 are interposed between the top of the horn and the portion 26 in the annular ball-race formed in the latter, thereby providing a ball-bearinged caster structure.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. In a truck for stoves, or the like, a sheet metal frame including a central dished leg receiving portion, spaced radially extending caster mounting portions bent outwardly from said central portion, and reinforcing flanges extending along said mounting portions and the periphery of said leg receiving portion at each side of the bend between said portions, and casters swivelly supported on said mounting portions.

2. In a truck for stoves, or the like, a sheet metal frame including a circular dished leg receiving portion having a peripheral wall including spaced extension portions, spaced radially extending caster mounting portions bent outwardly from said extension portions, and reinforcing flanges extending along and connecting the side edges of said mounting portions and said extension portions at each side of the bend between them, and casters swivelly supported on said mounting portions.

3. In a truck for stoves, or the like, a sheet metal frame including a central dished leg receiving portion and spaced radially extending caster mounting portions bent outwardly from said central portion, said mounting portions being centrally apertured and including pressed-up annular channels surrounding said apertures in spaced relation and providing ball-races at the under sides of said mounting portions, casters swivelly supported on said mounting portions including horns and spindles secured in said apertures of said mounting portions, and balls interposed in said ball-race portions between the upper sides of said horns and said mounting portions.

Signed at Meriden, in the county of New Haven, and State of Connecticut, this 14th day of August, 1925.

JOHN ADOLPH JOHNSON.